United States Patent [19]

Johnson

[11] Patent Number: 5,781,853
[45] Date of Patent: Jul. 14, 1998

[54] RECREATIONAL STORAGE AND AUDIO APPARATUS

[76] Inventor: Kenneth W. Johnson, 2408 Yorktown, Apt 198, Houston, Tex. 77056

[21] Appl. No.: 391,786

[22] Filed: Feb. 21, 1995

[51] Int. Cl.$^6$ ................................................. H04B 1/08
[52] U.S. Cl. .................... 455/351; 455/350; 455/347; 381/205; 62/457.7
[58] Field of Search ........................ 455/90, 344, 347, 455/348, 349, 350, 351, 575, 128, 569; 381/188, 205; 62/457.7, 457.1; 280/30; 190/18 A; 191/50

[56] References Cited

U.S. PATENT DOCUMENTS

| | | | |
|---|---|---|---|
| 1,887,185 | 11/1932 | Quinby | 381/188 |
| 4,571,740 | 2/1986 | Kirby et al. | 455/351 |
| 4,700,395 | 10/1987 | Long | 381/90 |
| 4,817,191 | 3/1989 | Adams | 455/351 |
| 4,873,841 | 10/1989 | Bradshaw et al. | 62/457.7 |
| 4,939,912 | 7/1990 | Leonovich, Jr. | 455/351 |
| 5,040,241 | 8/1991 | Davison | 455/347 |
| 5,228,706 | 7/1993 | Boville | 280/30 |
| 5,235,822 | 8/1993 | Leonovich, Jr. | 455/344 |
| 5,269,157 | 12/1993 | Ciminelli et al. | 62/457.7 |
| 5,373,708 | 12/1994 | Dumoulin, Jr. | 62/457.7 |
| 5,447,041 | 9/1995 | Piechota | 455/351 |

*Primary Examiner*—Reinhard J. Eisenzopf
*Assistant Examiner*—Doris To
*Attorney, Agent, or Firm*—Kenneth D. Baugh

[57] ABSTRACT

A recreational storage and audio apparatus 10 is provided with a chest 12 having an open area 24 formed therein and a lid 36 for covering the open area. A pair of wheels 54 is coupled to a bottom wall 22 of the chest 12. A first handle 62 is pivotably coupled to one end of the chest 12 and a second handle 68 is mounted for slidable movement in the chest adjacent another end of the chest. The second handle 68 is provided to be used in conjunction with the first handle 62 when the second handle is moved to a first position to allow the chest 12 to be picked up and carried and is provided to be used in conjunction with the wheels 54 when the second handle is moved to a second position to allow the chest to be moved on the wheels and rolled in a horizontal direction. Additionally, an AM/FM radio 100, cassette player 110, and compact disc player 120 are coupled to and supported on the lid 36. A first set of speakers 136, is coupled to a front portion of the chest 12 and a second set of speakers is coupled to the front portions of the chest below the first set of speakers. A third speakers 140 is pivotably coupled to each end of the chest 12.

3 Claims, 5 Drawing Sheets

RECREATIONAL STORAGE AND AUDIO APPARATUS

TECHNICAL FIELD

This invention relates to a recreational apparatus and more particularly to a recreational apparatus which provides a storage container for carrying and cooling food while also providing a music system, all in a single structure. The popularity of recreational endeavors and particularly outdoor recreational endeavors makes proper accessories an ongoing concern. This concern will normally result in a person carrying a plurality of individual recreational implements to enhance the recreational experience. It is not at all unusual to find a person carrying the most popular implements such as a cooler, for storing and cooling food stuffs, musical devices, such as, amplifiers, speakers, compact disc players, and/or tape players and an apparatus to conveniently transport all of these individual items. Of course all of these particular recreational implements are believed to be absolutely necessary for the success of the recreational experience. It is no doubt that having to carry and keep up with all of this can be cumbersome and somewhat inconvenient, not to mention that all of these individual implements can be expensive.

Accordingly, an apparatus is desirable that will allow a user to discord these individual recreational implements and provide an apparatus which will contain all of these more popular recreational implements, in a single structure.

BACKGROUND OF THE ART

Attempts have been made to provide devices that will incorporate more than one recreational implement into a single structure. One such device is disclosed in U.S. Pat. No. 4,700,395. This device is a combination cooler and speaker system. This arrangement includes an audio signal input terminal mounted on an outer wall of the cooler. The audio input terminal is provided for receiving an audio signal from a separate device, which will drive the speaker elements mounted to the cooler enclosure. However, with this device the only implement that is a part of the cooler is the speaker elements. The other musical implements such as the radio or tape player are separate devices which must be provided. Another arrangement is disclosed in U.S. Pat. No. 5,235,822. This device is a beverage cooler in combination with an audio system. The device includes an AM/FM receiver, or optionally an AM/FM cassette deck or compact disc player unit and one or more speakers.

This arrangement satisfies some of a users recreational implement needs, but not all of the more popular ones.

Although both these devices have a number of implements some of which are common to both devices, these devices still do not address the concern of having all the more popular musical recreational implements in a single apparatus. There remains a need for such a device.

DISCLOSURE OF THE INVENTION

A recreational storage and audio apparatus in accordance with the principles of this invention is provided with a chest having an open area formed therein. A rotating means is provided which is coupled to a bottom portion of the chest for facilitating movement of the chest in a horizontal direction. The recreational storage and audio apparatus is also provided with a first handle pivotably coupled to one end of the chest and a second handle which is mounted for slidable movement in the chest adjacent another end of the chest. The second handle is provided to be used in conjunction with the first handle when the second handle is moved to a first position to allow the chest to be picked up and carried and is provided to be used in conjunction with the rotating means when the second handle is moved to a second position to allow the chest to be moved on the rotating means and rolled in a horizontal direction.

Further, the recreational storage and audio apparatus is provided with a cover and supporting means pivotably coupled to upper portions of the chest. The cover and supporting means allows access to the open area in the chest when pivoted to a first position and covers the open area in the chest when pivoted to a second position.

Additionally a means is provided coupled to and supported on the cover and supporting means for generating an audio signal.

The recreational storage and audio apparatus is also provided with a first transmitting means, which is coupled to a front portion of the chest for transmitting first portions of the audio signal.

Additionally a second transmitting means is provided which is coupled to the front portions of the chest below the first transmitting means for transmitting second portions of the audio signal. Further a third transmitting means is pivotably coupled to each end of the chest for transmitting a third portion of the audio signal.

BRIEF DESCRIPTION OF THE INVENTION

The details of the invention will be described in connection with the accompanying drawing in which.

BEST MODE FOR CARRYING OUT THE INVENTION

Figure 1:
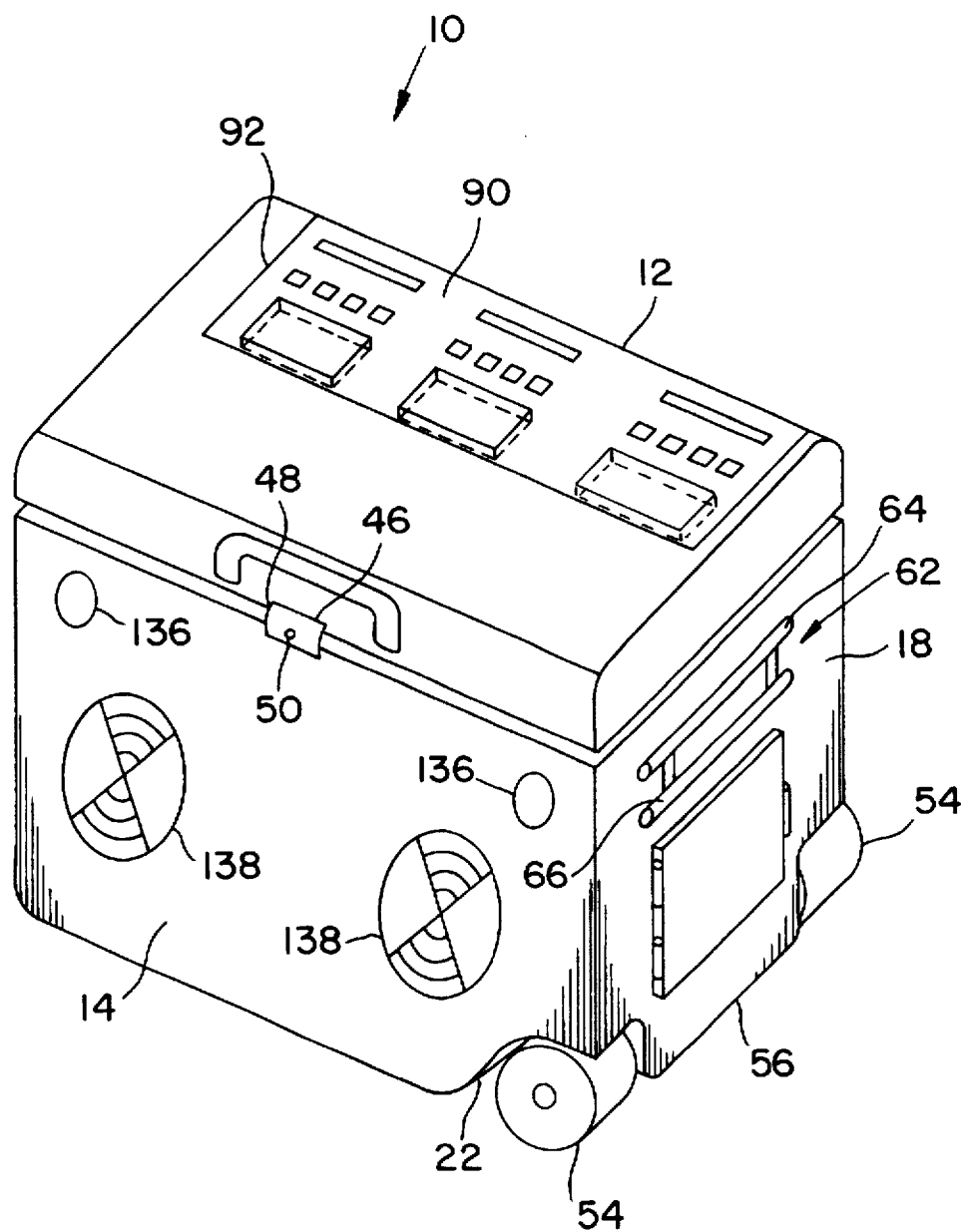
FIG. 1 is a perspective view illustrating a recreational storage and audio apparatus in accordance with the principles of this invention.
Figure 2:
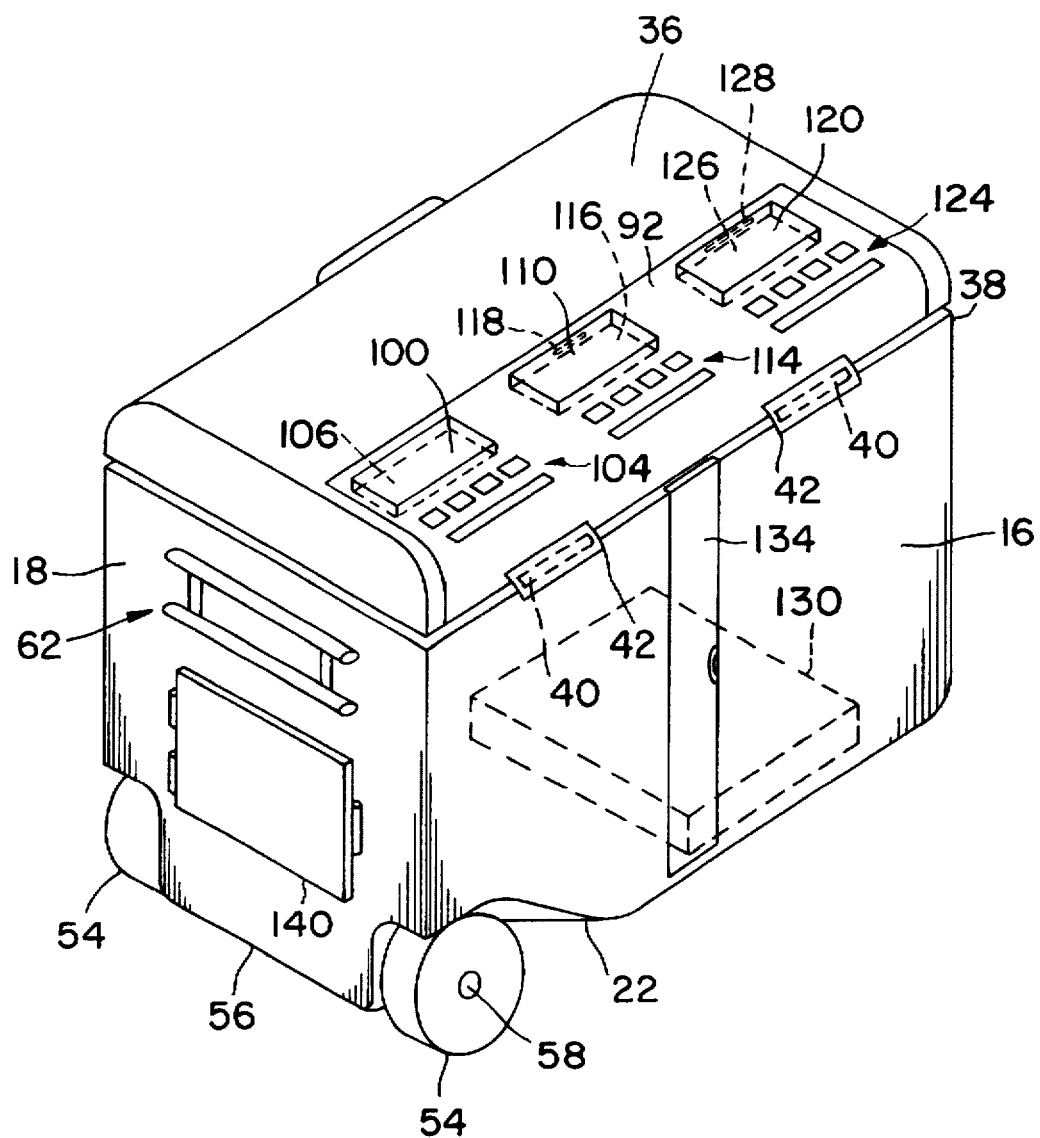
FIG. 2 is a second perspective view illustrating the recreational storage and audio apparatus in accordance with the principles of the invention.
Figure 3:
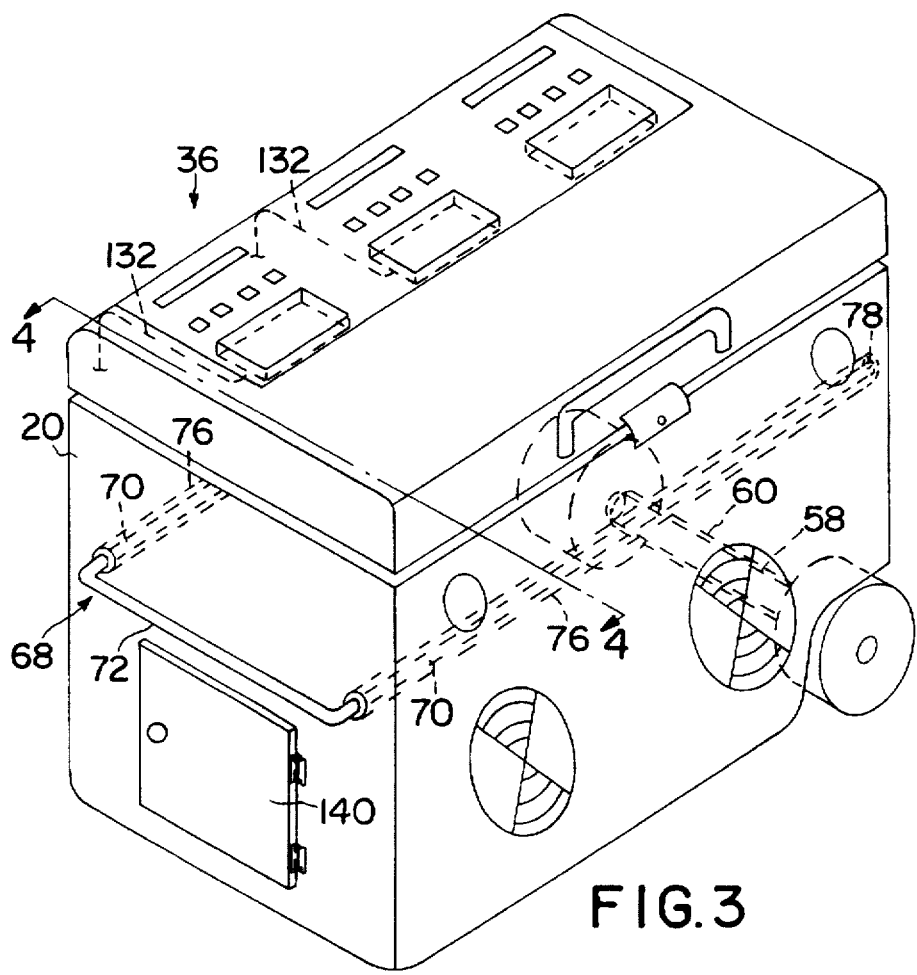
FIG. 3 is a third perspective view illustrating the recreational storage and audio apparatus in accordance with the principles of this invention.

Referring to FIGS. 1, 2 and 3 a recreational storage and audio apparatus, generally designated by the numeral, 10, is illustrated. The recreational storage and audio apparatus 10 includes a chest, generally designated, by the numeral, 12. The chest 12 is provided with front and back walls, 14 and 16, side walls, 18 and 20 and a bottom wall, 22. The walls 14, 16, 18, 20 and 22 are coupled together to form a rectangular shaped enclosure having an open area 24 (FIG. 4) formed therebetween.

Figure 4:
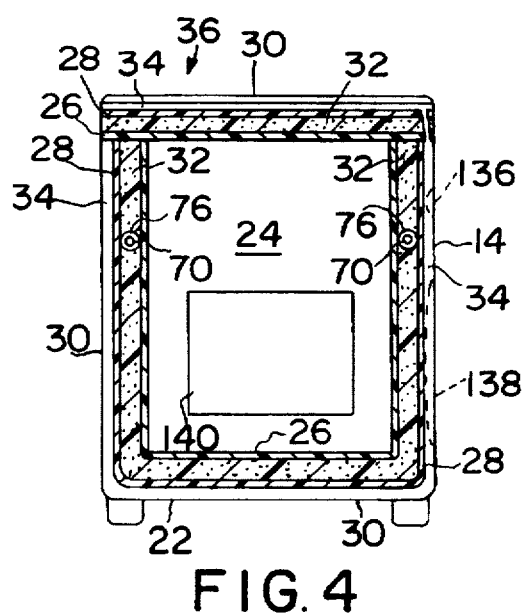
FIG. 4 is a sectional view of the recreational storage and audio apparatus in accordance with the principles of this invention taken along lines 4—4 of FIG. 3.

Referring to FIG. 4, the walls 14, 16, 18, 20 and 22 are each formed with an inside wall member 26, an intermediate wall member 28 and an outside wall member 30. An insulating member 32 is formed between the inside wall member 26 and intermediate wall member 28 in each wall 14, 16, 18, 20, and 22. The intermediate wall member 28 and the outer wall member 30 of each wall 14, 16, 18, 20, and 22 are aligned adjacent to each other with a space 34 formed therebetween.

The chest 12 is also provided with a lid or top, generally designated by the numeral, 36. The lid 36 is pivotably coupled to an upper portion 38 of the back wall 16 of the chest 12 by coupling members or hinges 40 illustrated by dotted lines in FIG. 2. The hinges 40 are shown aligned under insulating members 42. A latch, generally designated, by the numeral, 46 having a portion 48 formed on the lid 36 and another portion 50 formed on the front wall 14 of the chest 12 is provided to fasten the lid to the front wall and secure any contents inside the chest. The lid 36 like walls 14, 16, 18, 20, and 22 of the chest 12 is also formed with inside, intermediate and outside wall members 26, 28 and 30, respectively. Additionally, the lid 36 just as are the walls 14, 16, 18, 20, and 22, is also provided with an insulating member 22 formed between the inside wall member 26 and intermediate wall member 28 and a space 34 formed between the intermediate wall member and outside wall member 30.

The lid 36 serves as a cover for the chest 12 and a support structure for musical implements of the apparatus 10. The chest 12 will have the qualities of a cooler or ice chest. Accordingly, the chest 12 may be formed for example, of a lightweight hard plastic and the accompanying insulating materials such as that used in the manufacture of coolers.

A pair of wheels, 54 is rotably coupled to an end 56 of the bottom wall 22 of the chest 12 by a shaft or axle 58 (FIG. 3) which extends through an elongated opening 60 in the end of the bottom wall.

The chest 12 is also provided with a handle, generally designated by the numeral, 62 which is coupled to the side wall member 18 of the chest. The handle 62 is provided with a support member 64 coupled to the side wall 18 of the chest 12 and a grip member 66 pivotably coupled to the support member.

Another handle, generally designated by the numeral, 68 is mounted adjacent the end wall 20 of the chest 12 (FIG. 3, 5). The handle 68 is provided with a pair of elongated spaced adjacent arms, 70 and a horizontally extending arm or gripping member 72 which is coupled to the arms 70. Each arm 70 is slidably mounted in an elongated track or channel 76 which is formed in the insulating member 32 of the front, back, and end walls 14, 16, and 20, respectively. Each elongated arm 70 is provided with a slightly raised portion 78 at an end opposite the gripping member 72 to keep the arms from being pulled out of the tracks 76.

Figure 5:
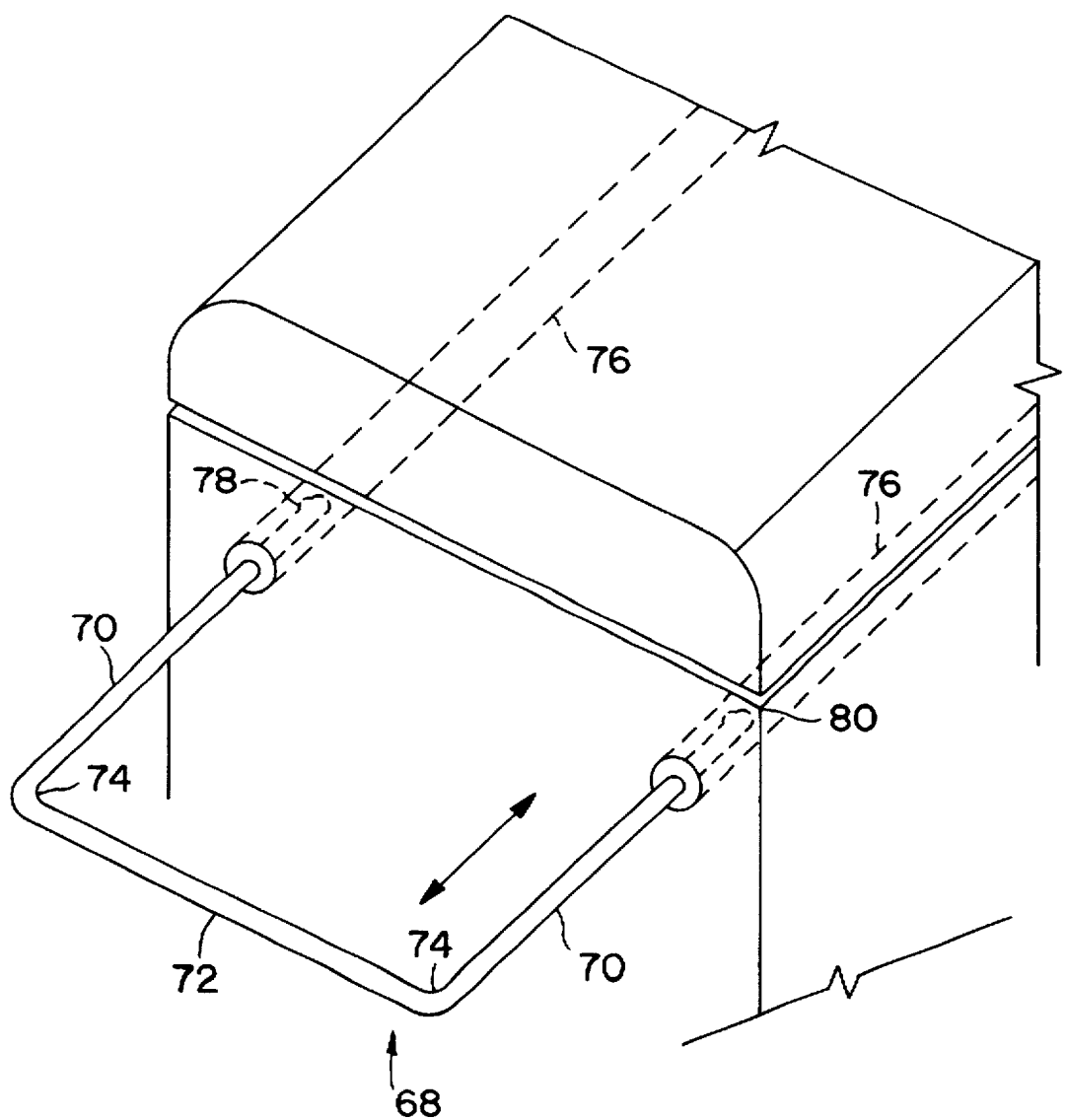
FIG. 5 is a partial sectional view of the recreational storage and audio apparatus illustrating a slidable handle in accordance with the principles of the invention.

The arms 70 are slightly longer than the track 76 so that the gripping member 72 is spaced from the end wall 20 when the handle is in a retracted position as illustrated in FIG. 3. Additionally the circumference of the elongated arms 70 is slightly smaller than that of the track 76 to provide for a snug fit and permit the arms to stay in the retracted position (FIG. 3) or extended position (FIG. 5) as desired by a user.

The handle 68 is provided to be used when retracted in conjunction with the handle 62 to allow a user to pick up and carry the chest 12 when desired and when extended to be used in conjunction with the wheels 54 to allow the user to pull and thus roll the chest on the wheels when desired.

The recreational storage and audio system 10 is also provided with a music component system 90 having a control panel, 92 which is mounted in the lid 36 of the chest 12.

The music component system 90 is provided with an AM/FM stereo radio 100 which is mounted in one side of the lid 36. The AM/FM stereo radio is provided with a control panel 104, which forms a part of the system control panel 92, and the standard operational components and circuitry 106 which of course would include an antenna. The control panel 104 is mounted in the lid 36. The operational components and circuitry 106 for the radio is aligned in the space 34 in the lid.

The music component system 90 of the apparatus 10 is also provided with a cassette tape player 110 which is mounted adjacent the radio 100 in an intermediate portion of the lid 36. The cassette tape player 110 also includes a control panel 114, which forms a part of the system control panel 92, and the standard operational components and the circuitry 116. The control panel 114 of the cassette tape player 110 is mounted in a position adjacent to the control panel 104. The operational components and circuitry 116 of the cassette tape player 110 is aligned in the space 34 in the lid 36. A cassette opening 118 for receiving a cassette tape (not shown) is formed in the lid 36 adjacent the operational components and circuitry 116 of the cassette tape player 110.

The music component system 90 of the apparatus 10 is also provided with a compact disc player 120. The compact disc player 120 is mounted adjacent the cassette tape player 110 on another side of the lid 36. The compact disc player 120 includes a control panel 124, which forms a part of the system control panel 92, and the standard operational components and circuitry 126. The control panel 124 is mounted in the lid 36 and the operational components and circuitry 126 of the compact disc player is mounted in the space 34 of the lid adjacent the cassette tape player's operational components and circuitry 116. A compact disc opening 128 for receiving the compact disc (not shown) is formed in the lid 36 adjacent the operational components and circuitry 126 of the compact disc player 120.

The music component system 90 of the recreational storage and audio apparatus 10 is also provided with a power supply generally designated, by the numeral, 130 (FIG. 2). The power supply 130 is mounted in the space 32 of the bottom wall 22 of the chest 12. The power supply 130 is a standard power supply capable of supplying power to the AM/FM stereo radio 100, the cassette tape player 110 and the compact disc player 118. The power supply 130 is electrically coupled to the AM/FM stereo radio 100, the cassette tape player 110, and the compact disc player 120 in a well known matter by electrical coupling members or wires 132. The wires 132 may for example extend from the power supply 130 up through the space 32 in the back wall 16 of the chest and into the open area 32 in the lid 36. In order to get from the space 32 in the back wall to the space 32 in the lid 36 the wires 132 may pass over the hinges 40 between the hinges 40 and the hinge insulating member 42 where they can be coupled to the radio 100, cassette tape player 110 and compact disc player 120. The hinge insulating member 42 is provided to cover and protect the wire 132 as it crosses over the hinge 40 to get into the space 32 in the lid 38. Access doors such as, for example, door 134 can be provided in the walls to allot access to wires 132 and other components of the music component system 90 for maintenance purposes.

The music component system 90 of the recreational storage and audio apparatus 10 is also provided with a pair of small speakers 136 such as, for example, high signal range speakers known as teeters which are mounted in a recessed manner (FIGS. 1 & 4) in an upper portion of the front wall 14 of the chest 12. A second pair of larger speakers 138, which may be a mid ranged signal speaker or a low range signal speaker known as midrange and wolfers respectively, is mounted in a recessed manner on the front wall 14 of the chest 12 below the speakers 136. The speakers 136 and 138 are also electrically coupled to the AM/FM stereo radio, the cassette tape player, and compact disc players 100, 110, and 120, respectively, in a well known manner by wires 132 which may also follow a path from the speakers through the space 32.

Figure 6:
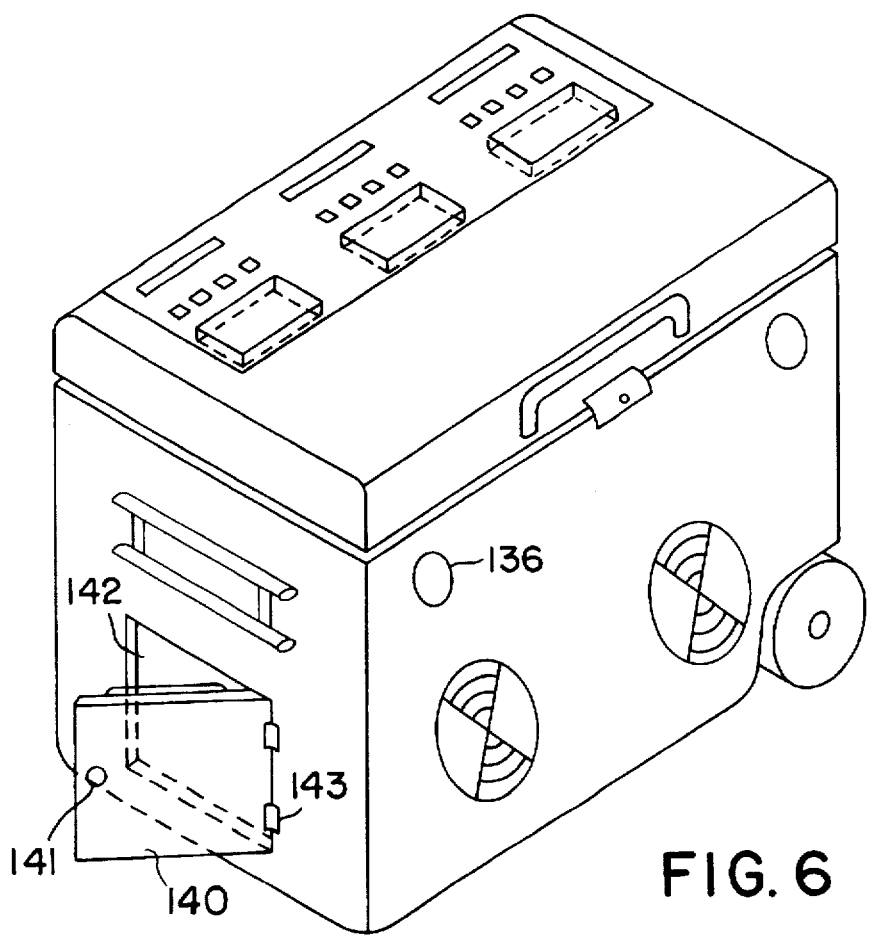
FIG. 6 is a fourth perspective view of the recreational storage and audio apparatus which further illustrates a side mounted wall speaker in accordance with the principles of this invention.
Figure 7:
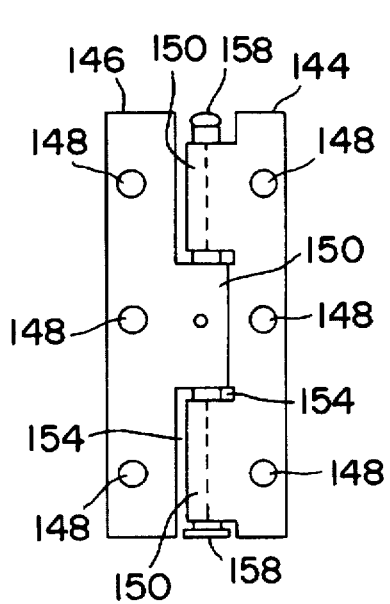
FIG. 7 is an exposed view of a hinge used in conjunction with the side mounted wall speaker of the recreational storage and audio apparatus in accordance with the principles of the invention.
Figure 8:
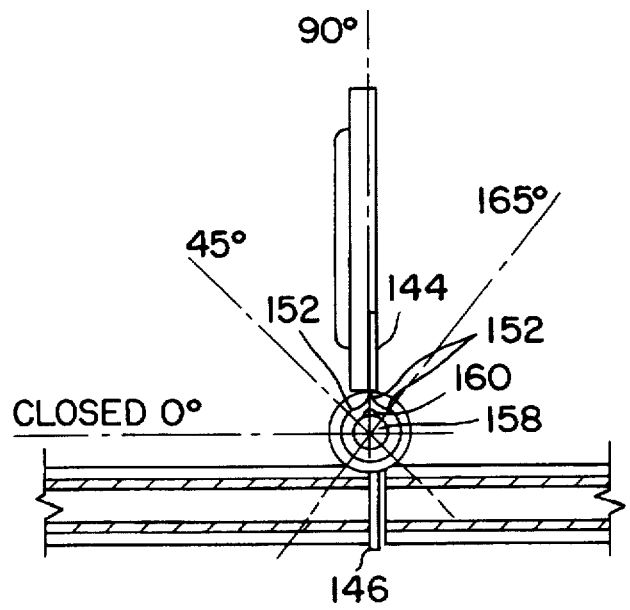
FIG. 8 is a cross-sectional view illustrating the operation of the hinge of FIG. 7.

Referring to FIG. 6, 7, and 8, the music component system 90 of the recreational storage and audio apparatus 10 is also provided with speaker 140 having a handle 141 coupled thereto. A speakers 140 is pivotably mounted to each of the side walls 18 and 20 of the chest 12 in an opening 142. Speakers 140 are mounted on the walls 18 and 20 by hinges, 143. The hinge 143 includes a pair of leaves 144 and 146 respectively. The leaves 144 and 146 each have mounting openings 148 formed therethrough. The leaf 144 is formed with a pair of spaced channels 150 having vertically extending openings formed therethrough. The leaf 146 is formed with a single channel 150 having a vertically extending opening formed therethrough. The channels 150 are also formed with a plurality of spaced vertically extending grooves 152 (FIG. 8). The grooves can be for example spaced apart at angles of approximately 45, 90, and 165 degrees along the circumference of the channels.

The leaves 144 and 146 are aligned adjacent to each other so that the channel 150 in one leaf rest in an adjacent space 154 of the other leaf. The result is that a continuous vertically extending channel is formed from the channels 150.

Screws not shown are screwed into holes 148 in the leaf 144 to couple this leaf to the speaker 140. Similarly screws are screwed into holes 148 of the leaf 146 to couple the leaf to the chest 12.

A coupling member or pin 158 is provided to pivotally connect the leaves 144 and 146 by insertion of the pin into the channels 150.

The pin 158 is coupled to the leaf 146 and is provided with a vertically extending protrusion or abutment 160 which is aligned on the pin 158. The abutment 160 is provided to engage and rest in an adjacently aligned groove 152 of the channels 150 when aligned therewith so that the hinge and thus the speaker 140 is locked in either the 45, 90, or 165 degree position as desired by the user.

As a result the speakers 140 can be moved to a closed position which is flush with the wall of the chest 12 or the speakers can be moved to a desired open position and locked in that position at one of the angles, as illustrated in FIG. 8 depending on which groove 152 is in locking engagement with the abutment 160.

It should be further understood that various changes and modifications can be made without departing from the spirit of the invention as defined in the claims.

What is claimed:

1. A recreational storage and audio apparatus including:
a chest having an open area formed therein, the chest including a pair of spaced side walls, a front and back wall, and a bottom wall coupled together to form a rectangular enclosure having the open area formed therein, wherein each wall includes an inside wall member, an insulating member adjacent the inside wall member, an intermediate wall member adjacent the insulating member, and an outside wall member aligned adjacent to the intermediate wall member having a predetermined space formed therebetween;

rotating means coupled to the bottom wall of the chest for facilitating movement of the chest in a horizontal direction, the rotating means including an axle rotably mounted to extend through the bottom wall of the chest at the back wall of the chest, a first wheel coupled to one end of the axle adjacent one side wall of the chest, and a second wheel coupled to the other end of the axle adjacent the other side wall of the chest;

a first handle pivotably coupled to the back wall of the chest, wherein the first handle is provided with a support member coupled to the one side wall of the chest and a grip member pivotably coupled to the support member;

a second handle mounted for slidable movement in the chest adjacent to the front wall of the chest for use in conjunction with the first handle when the second handle is moved to a first position to allow the chest to be picked up and carried and for use in conjunction with the rotating means when the second handle is moved to a second position to allow the chest to be moved on the rotating means and rolled in a horizontal direction, the second handle including a first elongated member having first portions thereof mounted for slidable movement in the insulating member in one side wall of the chest and second portions thereof mounted for slidable movement in the insulating member in the front wall of the chest, a second elongated member having first portions thereof mounted for slidable movement in the insulating member in the other side wall of the chest and second portions thereof mounted for slidable movement in the insulating member in the front wall of the chest, and a horizontally extending grisping member coupled to the first and second elongated members at the ends thereof which are coupled for slidable movement in the front wall of the chest;

a cover and supporting means pivotably coupled to upper portions of the chest for allowing access to the open area in the chest when pivoted to a first position and for covering the open area in the chest when pivoted to a second position, the cover and supporting means including a lid pivotably coupled to the back wall of the chest and fastenable to the front wall thereof;

means coupled to and supported on the lid for generating an audio signal, the means for generating an audio signal including, a power source, An AM/FM radio electrically coupled to the power source, a cassette tape player coupled to the power source, and a compact disc player coupled to the power source;

a first transmitting means coupled to the one side wall of the chest for transmitting first portions of the audio signal which includes a first pair of speakers;

a second transmitting means coupled to the one side wall of the chest below the first transmitting means for transmitting second portions of the audio signal which includes a second pair of speakers;

a third transmitting means pivotably coupled to each one of the front and back walls of the chest for transmitting third portions of the audio signal, which includes first and second speakers and a means for pivotably coupling the first speaker to the front wall of the chest and the second speaker to the other end of the chest, the coupling means including a first leaf member, a first plurality of spaced members having an opening formed therethrough and a plurality a vertically extending spaced groves formed therein, a second leaf member, a channel member having an opening formed therethrough and a plurality of vertically extending spaced groves formed therein, coupling means coupled to the first and second leaf members for coupling the first and second leaf members at outermost portions thereof for pivotable movement, an elongated locking member, coupled to extend vertically along the length of the coupling means, a first leaf member coupling means for coupling the first leaf member to the chest, and a second leaf member coupling means for coupling the second leaf member to the speaker so that the locking member formed by the coupling means can be aligned with a selected groove in the channel members so that the locking member will engage the groove and rest in the groove and thereby lock the speaker in one of a plurality of a predetermined selected positions.

2. An apparatus as defined in claim 1 wherein the locking member has demenions substantially the same as the grooves in the channel members so that when the locking member engages the grooves in the channel members the locking member will come to rest in and be locked securely in the grooves.

3. An apparatus as defined in claim 2 wherein the lid includes:

an inside wall member;

an insulating member adjacent the inside wall member;

an intermediate wall member adjacent the insulating member; and an outside wall member aligned adjacent to the intermediate wall member having a predetermined space formed therebetween.

* * * * *